US 11,928,104 B2

(12) United States Patent
Poddey et al.

(10) Patent No.: US 11,928,104 B2
(45) Date of Patent: Mar. 12, 2024

(54) METHOD AND DEVICE FOR OPERATING A DECENTRALIZED APPLICATION BY USERS OF A BLOCKCHAIN

(71) Applicant: Robert Bosch GmbH, Stuttgart (DE)

(72) Inventors: Alexander Poddey, Wiernsheim (DE); Fredrik Kamphuis, Kalkar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 126 days.

(21) Appl. No.: 17/447,353

(22) Filed: Sep. 10, 2021

(65) Prior Publication Data
US 2022/0100735 A1 Mar. 31, 2022

(30) Foreign Application Priority Data
Sep. 30, 2020 (DE) .......................... 102020212330.6

(51) Int. Cl.
*G06F 16/20* (2019.01)
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC .... G06F 16/27; G06F 16/2379; G06F 9/3869; G06Q 20/0655
USPC ........................................................ 707/703
See application file for complete search history.

(56) References Cited

U.S. PATENT DOCUMENTS

| 2017/0236123 | A1* | 8/2017 | Ali | G06Q 20/3825 |
| | | | | 705/75 |
| 2018/0123882 | A1* | 5/2018 | Anderson | H04L 43/16 |
| 2019/0102163 | A1* | 4/2019 | Witherspoon | G07C 13/00 |
| 2019/0253239 | A1* | 8/2019 | Shao | G06Q 50/188 |
| 2019/0332702 | A1* | 10/2019 | Manamohan | H04L 9/50 |
| 2020/0193434 | A1* | 6/2020 | Ma | H04L 9/0643 |
| 2020/0286049 | A1* | 9/2020 | Basu | G06F 16/21 |

FOREIGN PATENT DOCUMENTS

| DE | 102017214902 A1 | 2/2019 |
| DE | 102018210224 A1 | 12/2019 |

OTHER PUBLICATIONS

Coleman et al., "Counterfactual: Generalized State Channels," 2018, pp. 1-48. <https://l4.ventures/papers/statechannels.pdf> Downloaded Sep. 3, 2021.

* cited by examiner

*Primary Examiner* — Vincent F Boccio
(74) *Attorney, Agent, or Firm* — NORTON ROSE FULBRIGHT US LLP; Gerard A. Messina

(57) ABSTRACT

A method for operating a decentralized application by users of a blockchain. In the method, a first user proposes a state change on a state channel anchored in a blockchain. If a confirmation of the state change by the other users on the state channel does not occur, the first user prompts the other users to confirm within a predefined time span on the blockchain. If the confirmation also does not occur on the blockchain, the state change is carried out at the blockchain.

9 Claims, 5 Drawing Sheets

METHOD AND DEVICE FOR OPERATING A DECENTRALIZED APPLICATION BY USERS OF A BLOCKCHAIN

CROSS REFERENCE

The present application claims the benefit under 35 U.S.C. § 119 of German Patent Application No. DE 102020212330.6 filed on Sep. 30, 2020, which is expressly incorporated herein by reference in its entirety.

FIELD

The present invention relates to a method for operating a decentralized application by users of a blockchain. The present invention also relates to a corresponding device, to a corresponding computer program as well as to a corresponding memory medium.

BACKGROUND INFORMATION

Any protocol in computer networks that initiates a consensus with respect to the sequence of particular transactions is referred to as a decentralized transaction system, a transaction database or a distributed ledger. One common form of such a system is based on a blockchain and forms the basis of numerous so-called cryptocurrencies.

The consensus method most frequently used according to the related art provides a proof of work (PoW) for the generation of new valid blocks. In order to counteract excessive energy consumption caused by producing such proofs, and an unnecessary expansion of the blockchain, so-called transaction channels or state channels have been provided and generalized, which connect individual users off the blockchain (off-chain) but are nevertheless anchored in the latter. An overview of this technology is provided by COLEMAN, Jeff, HORNE, Liam, XUANJI, Li, "Counterfactual: Generalized state channels," 2018.

German Patent Application No. DE 102018210224 A1 describes in a specific embodiment according to claim 6 the following method for agreeing to a collaboration between two systems. The first system sends its assumptions with respect to the second system and its guarantees granted to the second system; conversely, the second system sends its assumptions with respect to the first system and guarantees granted to it. A transaction database receives these mutual assumptions and guarantees, checks whether they correspond to one another, if necessary, draws up a digital security contract to be concluded between the systems and, finally, documents the security contract by adding a corresponding block to a blockchain. It then sends the block with the security contract to both systems, which start the collaboration once they receive the block. The systems establish a mutual transaction channel for this purpose on which they exchange pieces of information and signed messages after the block is received. If one of the systems receives a piece of information violating the security contract, it asks the transaction database for arbitration. The transaction database notifies the other system of the arbitration, requests from the other system the information—allegedly violating the security contract—and checks the latter based on the security contract.

Such intelligent contracts (smart contracts) embody the transactional logic of every distributed application (dApp) of a transaction database. German Patent Application No. DE 102017214902 A1, for example, describes an intelligent contract for preparing and/or executing transactions between an owner of a terminal and a service provider, the intelligent contract including conditions of the service provider for services of an information service provider, in particular, conditions regarding utilization fees, preferably a road toll, and/or for services of a service provider, in particular, conditions regarding license fees, preferably regarding parking fees, refueling fees, fees of a charging station for the terminal and/or conditions of an insurance and/or conditions regarding user fees, preferably regarding fees for the shared use of the terminal for providing and/or aborting a service and/or conditions defined by the owner of this terminal for an acceptance and/or termination of the service, the intelligent contract being executed in an authorization node of a computer network based on a blockchain.

SUMMARY

The present invention provides a method for operating a decentralized application by users of a blockchain, a corresponding device, a corresponding computer program as well as a corresponding memory medium.

A method according to an example embodiment of the present invention is based in this case on the finding that in conventional state channel structures there is usually no time concept available in the off-chain phase. However, a time concept is also advantageous or even necessary even in the off-chain phase of a corresponding protocol.

This limitation is overcome by the approaches discussed in detail below, in accordance with example embodiments of the present invention. In summary, use is made of the fact that the underlying blockchain specifies via the block number or block depth an indirect but stringent time concept and furthermore even offers numerous distributed transaction systems possibly less, but nevertheless sufficiently secure, access to an essentially differentiated time concept such as, for example, the service "now( )" in Ethereum. The features described below make use of precisely this time concept and derive therefrom a time concept for the off-chain phase of channel constructs, which is based on a single or even on multiple flexibly usable time frames for the following timing cases, which may occur individually or in connection with one another:
1. agreement and implementation of that time frame, within which a response of the next user or users must take place and
2. agreement and implementation of that time frame, which may be used in any case for the next response in order to prevent a premature implementation.

Both applications are in turn suitable for two scheduling approaches:
1. strict clocking (with compulsory and/or predominant maintenance of the intervals) and
2. quickest possible application progress.

Advantageous refinements of and improvements on the basic features of the present invention are possible with the measures disclosed herein.

BRIEF DESCRIPTION OF THE DRAWINGS

Exemplary embodiments of the present invention are represented in the figures and explained in greater detail in the following description.

DETAILED DESCRIPTION OF THE DRAWINGS

Figure 1:
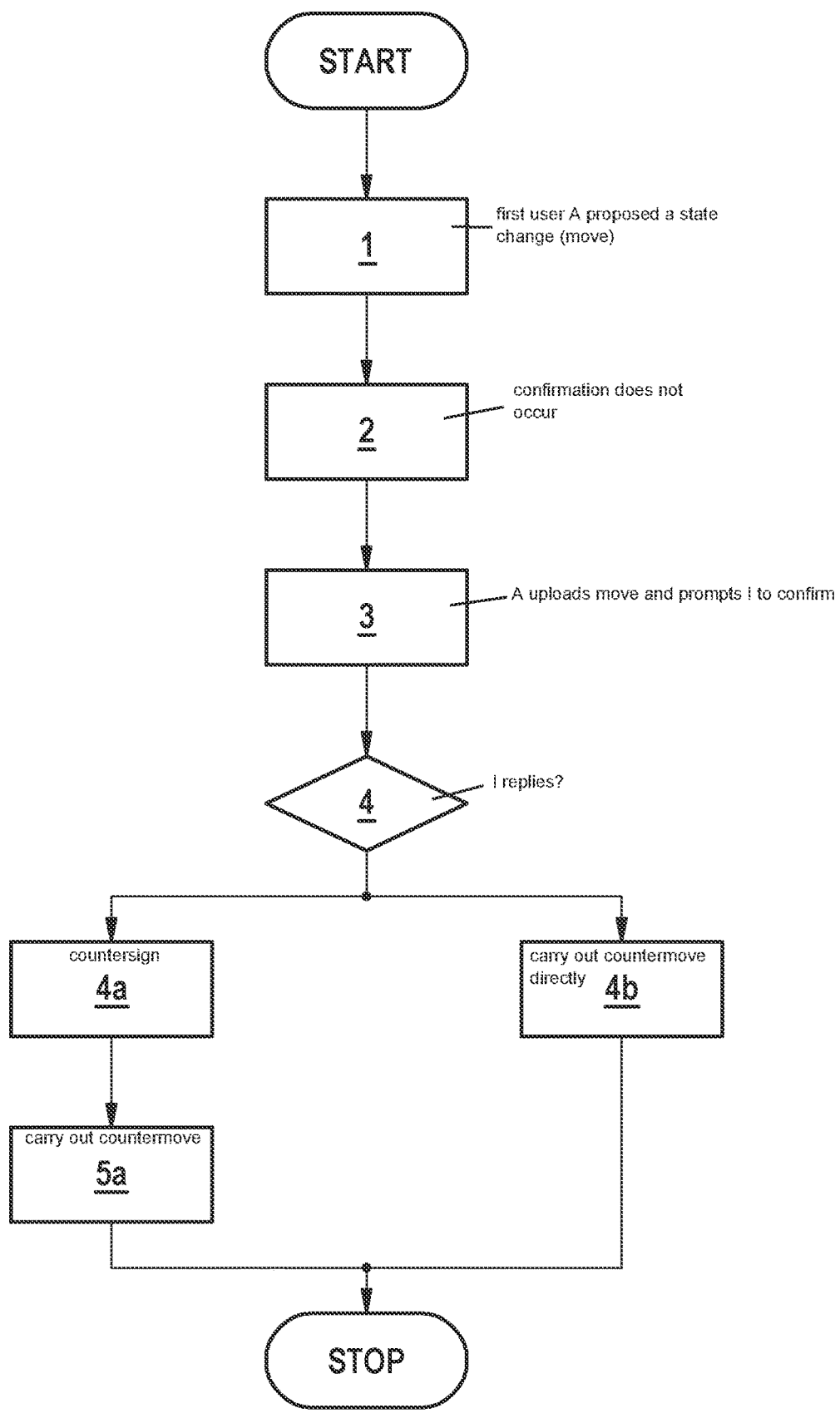
FIG. 1 shows the flowchart of one method according to a first specific embodiment of the present invention.

FIG. 1 illustrates the basic steps of a method according to the present invention, which is now explained in detail with reference to FIGS. 2 through 4. In order to enable the implementation of a coordinated time control in state channel interactions, a row of data fields is introduced for this purpose as part of the channel state or dApp state.

The case with strict interval clocking is initially considered.

The state provides individual substeps of duration $\Delta_i$ or a shared value for all steps of the protocol. For the sake of simplicity, the latter case is discussed here, a generalization is easily possible.

Figure 2:
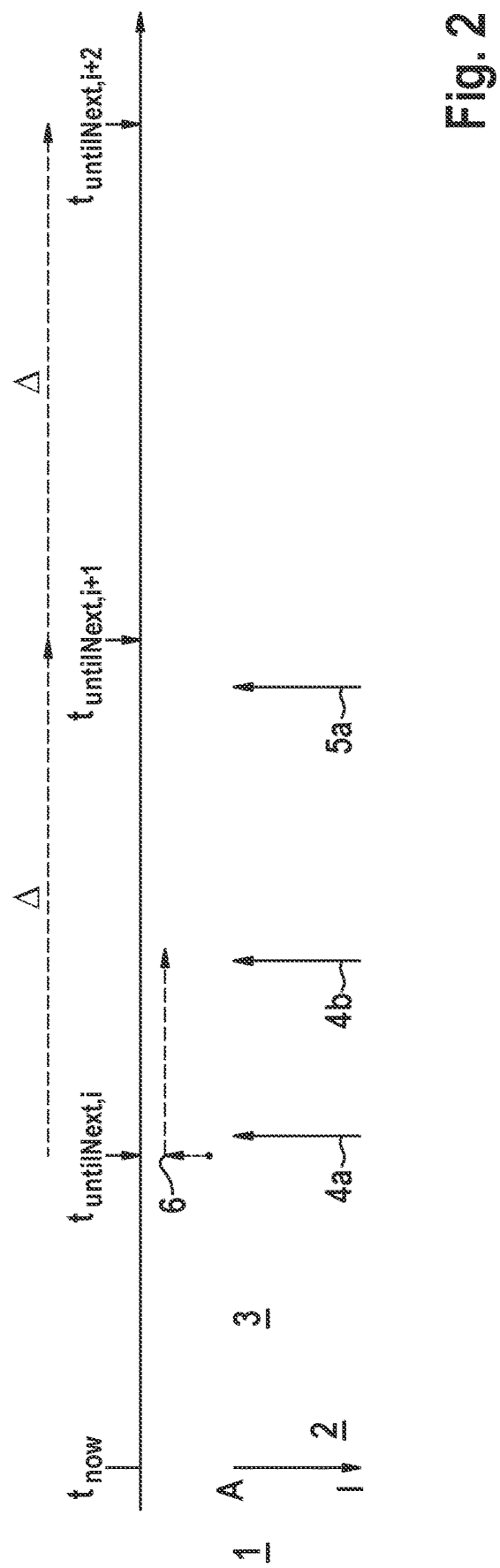
FIG. 2 shows the interactions at strict clocking.

FIG. 2 illustrates the time sequence and by way of example, the actions of two channel users A and I, which by no means rules out further users on the channel. Assume there is a supported state, which already predefines the point in time $t_{untilNext,i}$, and it is A's turn. (The protocols such as "forceMove" based on move sequences are considered below, since these are more strongly affected; however, a generalization to protocols including arbitrary step sequences is possible).

In first step (1) as depicted, first user A proposes a state change $m_A$ (referred to hereinafter consistently as "move," according to game theory), the user shifting $t_{untilNext}$ in conformance with the rules by predefined time difference $\Delta$ into the future, which may be checked by the program logic of the dApp—whether off-chain by other users or by the blockchain itself functioning as a virtual arbitrator:

$$t_{untilNext} = t_{untilNext,i} + \Delta \quad \text{Formula 1}$$

If a confirmation by second user I on the state channel does not occur 2, A uploads move $m_A$ 3 and prompts I by way of a challenge to confirm within the "Challenge period," i.e., within a predefined time span 6 on the blockchain. If I fails even there to promptly reply on the move—as is usual in corresponding arbitrations on blockchains—the state change is adopted by the blockchain, and A may close the channel.

In the present example, user I replies either—with no progression of the dApp program logic or state change—by countersigning of $m_A$ 4a and accepts in this way the latest possible point in time $t_{untilNext,i+1}$ for its countermove 5a, or it complies with the request by immediately carrying out a countermove $m_I$ and updating in the process:

$$t_{untilNext} = \max(t_{now}, t_{untilNext,i+1}) + \Delta \quad \text{Formula 2}$$

The function max covers the case in which the I exceeds value $\Delta$ of time span 6 granted within the scope of the request, as a result of which a reply after point in time $t_{untilNext,\ i+1}$ is considered. In this case, the strict interval clocking, which would otherwise be continued with $t_{untilNext,i+2}$ is to be shifted accordingly in order to grant the next user the agreed upon time difference $\Delta$. In order to avoid any deviation from the time frame provided, time span 6 would therefore have to be selected to be equal to or shorter than A.

After step 4b and 5a, initial situation 1 with reversed roles of A and I is achieved, and the protocol may progress accordingly.

As a general rule, user I making its move responds promptly and thus prevents the challenge and reply on the block chain (on chain).

In sequence-based protocols such as "forceMove," steps 4a and 4b would refer to an uneven move number j if A is the first channel user. If, however, the concept of the flexibly supported states is applied, in which an actor following in the sequence is able to propose a state for the then valid move number, and all other users sign this state, then the proposed combination of steps 4a and 5a would be possible. In this case, I carries out move $m_I$ under number j+2. If A delivers its signature, the protocol is continued. If not, I would prompt user A to do so while referring to the supported state. If the blockchain in this case decides in favor of A without the latter, however, adopting proposed state change $m_1$ in the dApp, it would again be I's turn thereafter and I could again propose and finally implement this state.

If the application progression on the channel may be suspended for a definite or indefinite period of time, that user whose turn it was prior to the suspension may note this in the state memory. For a limited period of the interruption, $t_{untilNext}$ could be updated accordingly. Various approaches are possible for an indefinite period of time. Thus, for example, $t_{untilNext}$ could be set to a defined value such as zero. Alternatively, an additional data field could be used, for example, a Boolean variable $t_{suspended}$, which reflects the state of the suspension.

Furthermore, the techniques described in accordance with example embodiments of the present invention, in addition to the establishment of a time frame within which the next move must take place, may also be used to establish a time frame, which the users could exhaust without being penalized or being compelled—for example, by a challenge—to carry out their move. This may be implemented, for example, by not allowing the challenge prior to an agreed upon point in time. Both methods may also be used simultaneously, i.e., establishment of time intervals, which may be exhausted while simultaneously limiting the maximum duration. The advantage of this approach and of the use of different time intervals $\Delta_i$ is that it is left to the channel users to agree in detail about the time specifications on a channel off the block chain, for example, per move, per round or as a function of the dApp state.

When utilizing a channel protocol such as "perun," which provides no prescribed sequence, the time specifications may be easily implemented in the manner discussed above. In summary, each user has the opportunity to propose time limitations by the user setting the corresponding data fields, and the other users may either agree or be compelled to answer in an arbitrary order.

An extension of the strict clocking is described below in order to enable a preferably rapid application progression in the channel construct. In this case, only differences are discussed; the basics described above apply here as well. Initially to be discussed is the path depicted in FIG. 3, on which a confirmation of the state change by second user I does not occur 2. From this follows the alternative path as a simplified sequence.

The basis of this expansion is formed by the use of two additional data fields: a preferred point in time $t_{uNo}$ to be maintained in the best case and an optional time buffer $\delta$. For a quickest possible sequence, user A making the move updates in step 1 not only $t_{untilNext}$ as usual, but also proposes on the basis of the instantaneous time a preferred point in time that would have to be maintained under optimistic assumptions:

$$t_{uNo} = t_{now} + \Delta + \delta \quad \text{Formula 3}$$

The basic idea in this case is that the user making the move, if he is unable or would not like to completely exhaust time difference Δ, may propose shifting the reference for the time boxing in accordance with the time saved. An additional shorter time period δ may be agreed to by the users in order to compensate for usual delays, for example, due to communication difficulties, so that the receivers of the proposal are able to receive the proposal in the best case prior to point in time $t_{now}+\delta$ and to utilize time difference Δ completely for their own move. In one alternative embodiment of the method, δ may be disregarded and any delay of communication within the scope of Δ may be considered.

Figure 3:
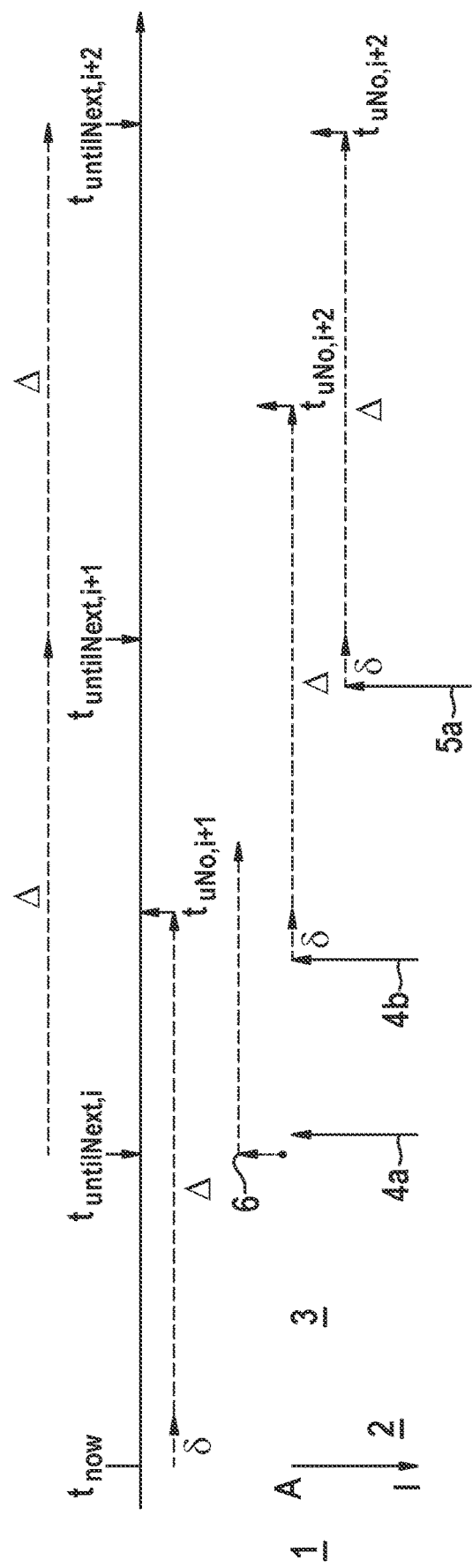
FIG. 3 shows the interactions at the quickest possible clocking in a first application.

In the scenario according to FIG. 3, a confirmation of the state change by second user I does not occur 2 on the state channel. In this case A forces a move exactly as in the strict clocking by requesting 3 I for this purpose via a challenge on the blockchain. Proposed point in time $t_{uno,i+1}$ is initially ignored. I could take up this request in a timely manner by either countersigning $m_A$ 4a and carrying out his countermove $m_1$ 5a by point in time $t_{untilNext,i+1}$ or by carrying out 4b the latter directly within time span 6. In both step 4b as well as in step 5a, a value for $t_{uNo}$ and thus a preference for the time boxing may be proposed. It should be noted here that—as discussed above in conjunction with the strict clocking—the relationship between the time span 6 granted within the framework of the challenge and A must be considered.

The protocol is then continued with reversed roles or—in the case of further channel users—between I and the user subordinate in the move sequence.

Figure 4:
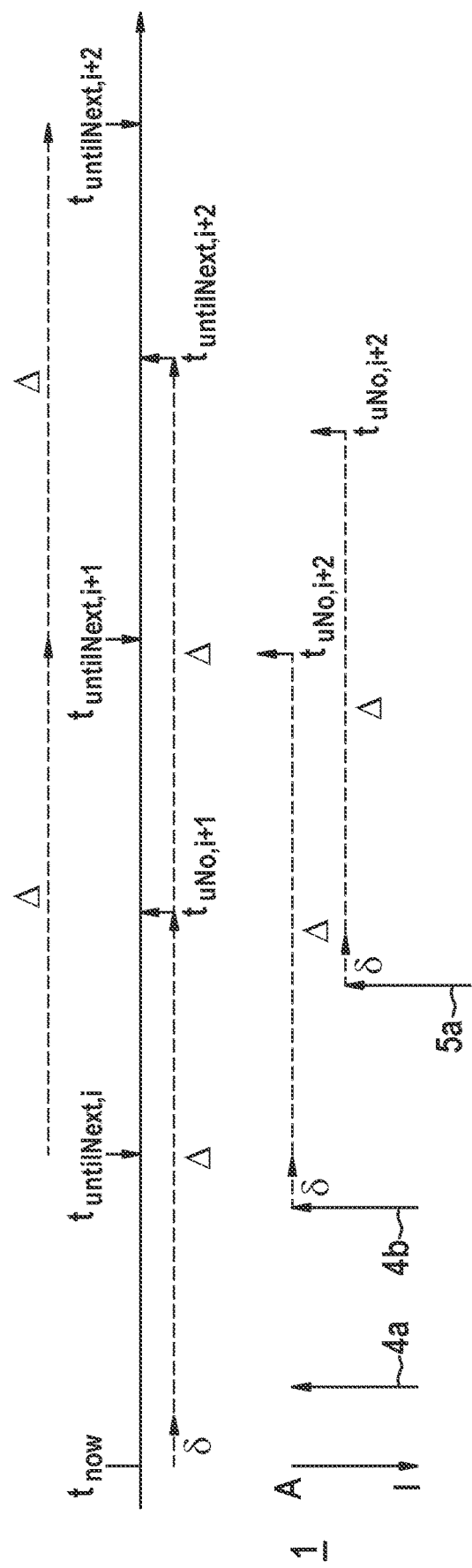
FIG. 4 shows the interactions at the quickest possible clocking in a second application.

FIG. 4 illustrates the alternative path, according to which the proposed state is accepted. As discussed above, such a confirmation may, basically, take place by a combination of steps 4a and 5a or by step 4b, this nevertheless with the stipulation that step 4a or 4b takes place prior to point in time $t_{untilNext}$—specifically $t_{untilNext,i}$ in the step depicted to the left in FIG. 4. Step 5a following step 4a in turn must take place prior to preferred point in time $t_{uNo}$—specifically $t_{uNo,i+1}$ in the step depicted to the left in FIG. 4, which has been confirmed in step 4a and thus replaces originally predefined point in time $t_{untilNext}$. If on the other hand step 5a does not occur, the escalation follows as described above. Actual steps 4b and 5a update $t_{untilNext}$ when applying the proposed and accepted temporal pre-shift:

$$t_{untilNext,i+2} = t_{uNo,i+1} + \Delta \quad \text{Formula 4}$$

As in the case of the strict interval clocking, both paths may alternate even with the quickest possible approach, so that the users may force as needed a move with minimal adverse effect on the blockchain and may then change back again to the sequence outside the chain. It should be emphasized once again that to simplify the above embodiments, a value Δ has been set across all steps. In the meantime, the users may communicate in one generalized specific embodiment in a variety of values Δ as a function of the type of move, dApp state, etc.; equally possible—as represented above—is the combination including a minimum time period, which the users may exhaust without being penalized or being forced to carry out their move.

Figure 5:
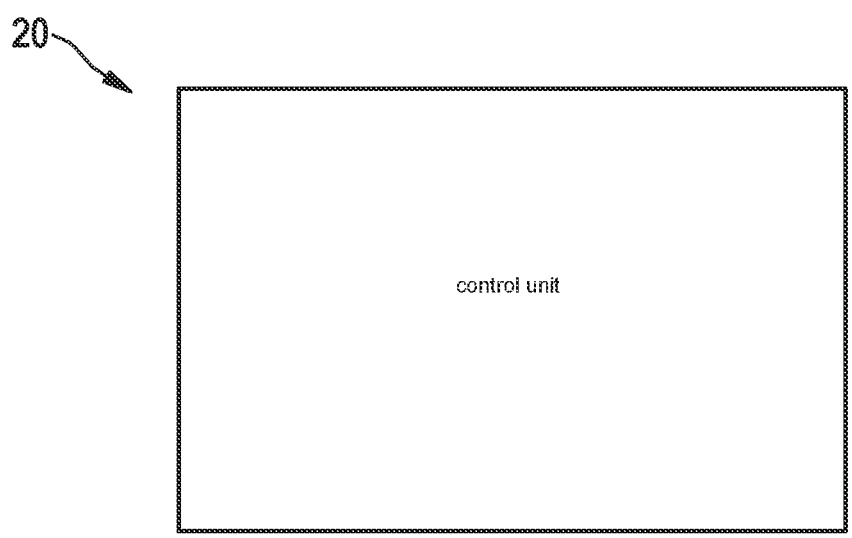
FIG. 5 schematically shows a control unit according to a second specific embodiment of the present invention.

This method may, for example, be implemented in software or in hardware or in a mixed form of software and hardware, for example, in a control unit 20, as illustrated by the schematic representation of FIG. 5.

What is claimed is:

1. A method for operating a decentralized application by two or more users of a blockchain, the method comprising the following steps:
   proposing, by a first user, a state change on a state channel anchored in a blockchain;
   prompting, by the first user, when a confirmation of the state change by other users on the state channel does not occur, the other users to confirm within a predefined time span on the blockchain; and
   carrying out, when the confirmation within the predefined time span does not occur, the state change at the blockchain, wherein the state channel connects users off-chain, wherein a time concept corresponding to multiple time frames is made available for the off-chain.

2. The method as recited in claim 1, wherein:
   the confirmation takes place by one or more other users countersigning the state change and proposing up to a predefined point in time a further state change updating the state change; or
   the confirmation takes place by one more other users directly proposing a further state change updating the state change.

3. The method as recited in claim 2, wherein:
   when proposing the state change, the point in time is shifted by a predefined time difference; and
   the time difference is predefined by the state channel.

4. The method as recited in claim 3, wherein:
   when the time difference falls below the time span granted for the confirmation; or
   when proposing the further state change, the point in time is established in such a way that the time difference at least still remains up to the point in time.

5. The method as recited in claim 2:
   when proposing the state change, the first user further proposes a preferred point in time; and
   when countersigning the state change, the point in time is set to the preferred point in time.

6. The method as recited in claim 5, wherein:
   when proposing the state change, the preferred point in time is established in such a way that the time difference at least still remains up to the preferred point in time.

7. The method as recited in claim 6, wherein:
   the preferred point in time is established in such a way that the time difference plus a time buffer agreed to between the user remains.

8. A non-transitory machine-readable memory medium on which is stored a computer program for operating a decentralized application by two or more users of a blockchain, the computer program, when executed by a computer, causing the computer to perform the following steps:
   proposing, by a first user, a state change on a state channel anchored in a blockchain;
   prompting, by the first user, when a confirmation of the state change by other users on the state channel does not occur, the other users to confirm within a predefined time span on the blockchain; and
   carrying out, when the confirmation within the predefined time span does not occur, the state change at the blockchain, wherein the state channel connects users off-chain, wherein a time concept corresponding to multiple time frames is made available for the off-chain.

9. A device for operating a decentralized application by two or more users of a blockchain, the device configured to:

propose, by a first user, a state change on a state channel anchored in a blockchain;

prompt, by the first user, when a confirmation of the state change by other users on the state channel does not occur, the other users to confirm within a predefined time span on the blockchain; and carry out, when the confirmation within the predefined time span does not occur, the state change at the blockchain, wherein the state channel connects users off-chain wherein a time concept corresponding to multiple time frames is made available for the off-chain.

* * * * *